(12) United States Patent
Yoshikawa et al.

(10) Patent No.: US 7,513,411 B2
(45) Date of Patent: Apr. 7, 2009

(54) METHOD OF AND APPARATUS FOR GRANTING ELECTRONIC SIGNATURE, AND COMPUTER PROGRAM

(75) Inventors: Nobuo Yoshikawa, Kawasaki (JP); Seigo Kotani, Kawasaki (JP); Takayuki Katou, Kawasaki (JP); Nao Ando, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/843,310

(22) Filed: May 12, 2004

(65) Prior Publication Data
US 2005/0061871 A1    Mar. 24, 2005

(30) Foreign Application Priority Data
Sep. 19, 2003    (JP) .............................. 2003-329072

(51) Int. Cl.
*G06F 17/00* (2006.01)
*H04K 1/00* (2006.01)
(52) U.S. Cl. ...................................... 235/375; 713/185
(58) Field of Classification Search ................. 713/176; 382/118; 235/379; 380/277
See application file for complete search history.

(56) References Cited
U.S. PATENT DOCUMENTS
5,590,224 A * 12/1996 Fast et al. .................... 382/291
5,872,848 A * 2/1999 Romney et al. ............. 713/176
2002/0023220 A1* 2/2002 Kaplan ........................ 713/176
2002/0078355 A1* 6/2002 Samar ......................... 713/176
2002/0186838 A1* 12/2002 Brandys ....................... 380/30
2003/0099361 A1* 5/2003 Uchida ........................ 380/277
2004/0062424 A1* 4/2004 Mariani et al. .............. 382/118
2004/0148502 A1* 7/2004 Gollner et al. .............. 713/167

FOREIGN PATENT DOCUMENTS
| EP | 0 458 718 A2 | 11/1991 |
| EP | 0 458 718 A3 | 11/1991 |
| EP | 586011 A1 | 3/1994 |
| GB | 2 376 389 | * 11/2002 |
| GB | 2376389 A | 12/2002 |
| JP | 2002-230202 | 8/2002 |
| WO | WO02/059728 | 8/2002 |

* cited by examiner

*Primary Examiner*—Daniel A Hess
(74) *Attorney, Agent, or Firm*—Staas & Halsey LLP (57) ABSTRACT

An apparatus for granting electronic signature to a data includes an identification-data acquiring unit that acquires identification data for identifying an owner of a secret key that is used to create the electronic signature, an authorization-data acquiring unit that acquires authorization data corresponding to the identification data acquired, and a signature-granting determining unit that determines whether to grant the electronic signature to the data based on the authorization data acquired.

19 Claims, 7 Drawing Sheets

| AUTHORIZATION LEVEL | PROCESSING CONTENTS |
|---|---|
| LEVEL A | PROCESSING A |
| LEVEL B | PROCESSING B |
| LEVEL C | PROCESSING C |

METHOD OF AND APPARATUS FOR GRANTING ELECTRONIC SIGNATURE, AND COMPUTER PROGRAM

BACKGROUND OF THE INVENTION

1) Field of the Invention

The present invention relates to a technology for issuing and granting an electronic signature.

2) Description of the Related Art

With advance of the technology, digitalizing the paper documents and saving the data of the paper documents digitalized are required. By digitalizing the paper documents, the space to save the paper documents is economized and the data of the paper documents are managed electronically. However, the electronic data has a problem that the electronic data can be falsified without leaving any trace. When the data is exchanged socially and commercially, the data-reliability and data-integrity are required socially and commercially by determining whether the data is falsified.

So far, the apparatus for granting electronic signature that creates the electronic signature using the public-key encryption method and grants the electronic signature to the electronic data has been made to solve this problem. The electronic signature that is granted to the electronic data indicates whether the electronic data is falsified.

The apparatus for granting electronic signature that uses the public-key encryption method creates the electronic signature using the secret key, and the certificate authority sets the expiration date for the secret key to have the higher-reliable secret key by expiring the secret key when needed.

An example of the apparatus for granting electronic signature is disclosed in Japanese Patent Application Laid-Open No. 2002-230202. The apparatus for granting electronic signature that uses the public-key encryption method creates the electronic data and the electronic signature from the paper documents that are acquired from the user of the service. While sending the electronic data and the electronic signature that are created to the user, the service provider saves both the electronic data and the electronic signature corresponding to the paper documents, so that the service provider guarantees the relationship between the paper documents and both the electronic data and the electronic signature.

The digitalization of the especially important paper documents must be performed correctly. However, the possibility of the failure of the digitalization exists actually. For example, when the scanner digitalizes the paper documents, the dirt on the paper may cause the scanner to miss the data. Another example is that the optical character reader (OCR) may recognize the wrong character. In these cases, the electronic data needs to be processed properly to redeem the failure of the digitalization.

The electronic document with the failure of the digitalization is less reliable, so that the paper documents still need to be saved, that is, the space for the paper documents can not be economized. To have the higher-reliable electronic document, the paper documents must be digitalized by the user who has the suitable knowledge and ability.

However, in the conventional apparatus for granting electronic signature, the reliability of the paper documents digitalized are determined by whether the electronic signature is granted, that is, the secret key is used. However, who knows the owner of the secret key has enough ability to digitalize the paper documents?

For example, in the conventional technology, the service provider saves the paper documents and both the electronic data and the electronic signature corresponding to the paper documents, and guarantees the relationship between the paper documents and both the electronic data and the electronic signature. However, the secret-key owner who does not have the authority to grant the electronic signature to the electronic data sometimes creates the electronic data and the electronic signature. Therefore, the relationship between the paper documents and both the electronic signature and the electronic data has not been guaranteed certainly.

The problem of the conventional technology is the lower reliability of the electronic signature, because the conventional apparatus for granting electronic signature does not determine whether the owner of the secret key has the authority to grant the electronic signature. Accordingly, determining whether to grant the electronic signature based on the secret-key owner's authority has been required.

In other words, the apparatus for granting electronic signature that grants the authority based on both the knowledge and the ability of the secret-key owner has been required to guarantee the proper digitalization.

SUMMARY OF THE INVENTION

It is an object of the present invention to solve at least the problems in the conventional technology.

The apparatus for granting electronic signature to a data, according to one aspect of the present invention includes an identification-data acquiring unit that acquires identification data for identifying an owner of a secret key that is used to create the electronic signature, an authorization-data acquiring unit that acquires authorization data corresponding to the identification data acquired, and a signature-granting determining unit that determines whether to grant the electronic signature to the data based on the authorization data acquired.

The method for granting electronic signature to a data, according to another aspect of the present invention includes acquiring identification data for identifying an owner of a secret key that is used to create the electronic signature, acquiring authorization data corresponding to the identification data acquired, and determining granting of the electronic signature to the data based on the authorization data acquired.

The computer program for granting electronic signature to a data, according to still another aspect of the present invention realized the method according to the present invention on a computer.

The device that provides a secret-key to a unit that creates an electronic signature for a data, according to still another aspect of the present invention includes a storing unit that stores authorization level information for specifying contents of processing to be performed to the data along with identification data for identifying an owner of the secret key.

The other objects, features, and advantages of the present invention are specifically set forth in or will become apparent from the following detailed descriptions of the invention when read in conjunction with the accompanying drawings.

DETAILED DESCRIPTION

Exemplary embodiments of a method of and an apparatus for granting electronic signature, and a computer program, according to the present invention are explained in detail with reference to accompanying drawings.

The apparatus according to a first embodiment of the present invention includes three functions: acquiring electronic data that is a target for granting an electronic signature; creating the electronic signature using a secret key; and granting the electronic signature to the electronic data.

The apparatus for granting electronic signature determines whether to grant the electronic signature to the electronic data based on an authority that an owner of a secret key has. In other words, the apparatus for granting electronic signature grants the electronic signature to the electronic data only when the owner of the secret key is authorized.

The secret key is used to create the electronic signature and is issued from an authority management organization that manages the authority of the secret-key owners. The authority management organization conducts trainings, which are trainings of digitalizing paper documents and creating the electronic signature, and qualifying tests for the users to grant the secret key. Only the users that pass the qualifying tests receive the secret keys. Consequently, the secret-key owners have the authority that is to create the electronic signature and the like guaranteed by the authority management organization.

Figure 1:
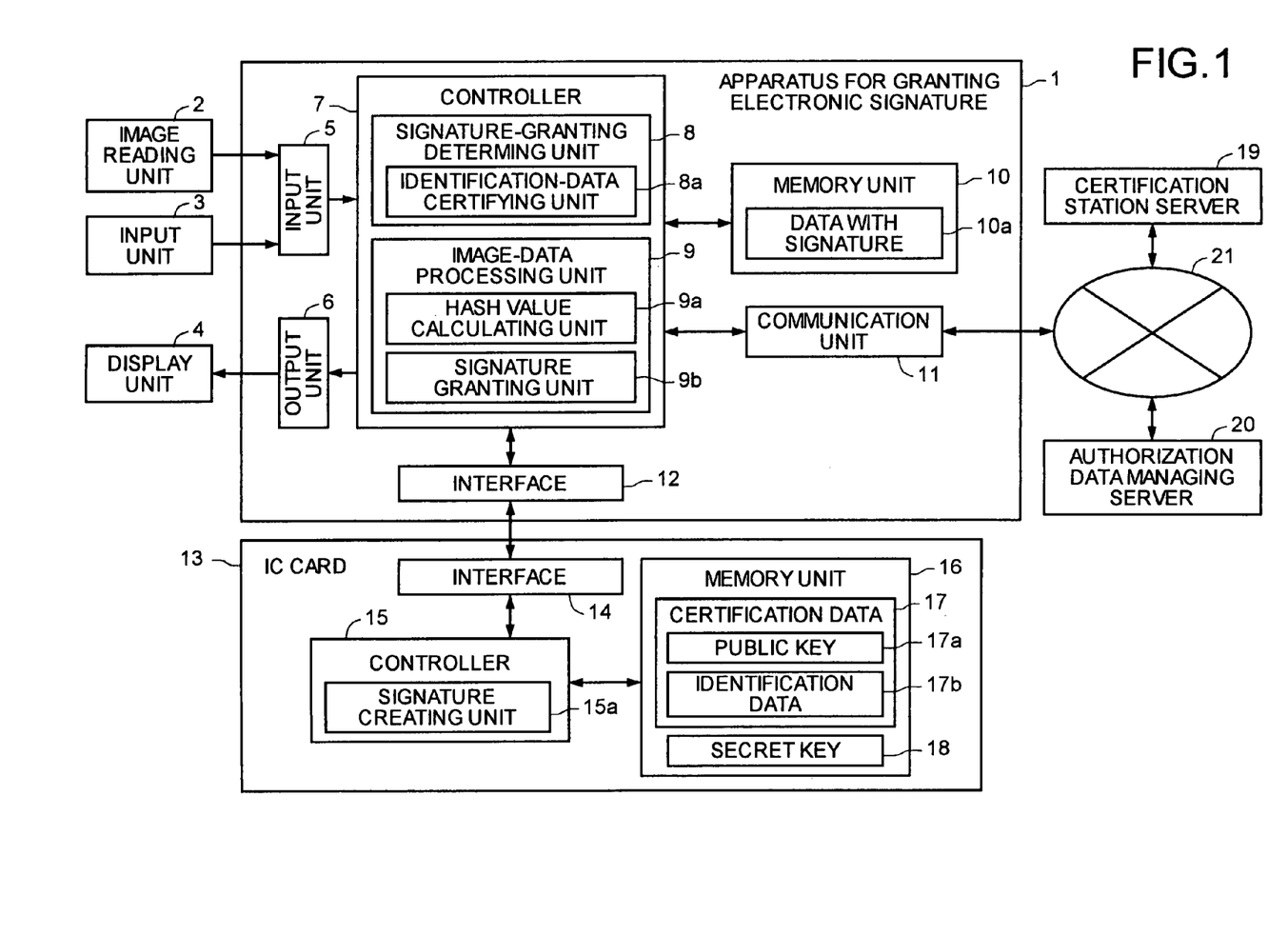
FIG. 1 is a schematic diagram of an apparatus for granting electronic signature, according to a first embodiment of the present invention.

FIG. 1 is a schematic diagram of an apparatus for granting electronic signature 1, according to the first embodiment. An image reading unit 2, such as a scanner, an OCR, an input unit 3, such as a keyboard, a mouse, a display unit 4, and an integrated circuit (IC) card 13 are connected to the apparatus for granting electronic signature 1. The IC card 13 is a card that has an IC chip inside to realize certain functions, and the IC chip realizes a function of a secret key 18. Moreover, the IC card 13 realizes a function of storing data such as a certificate 17 that includes an identification data 17b. A certification server 19 and an authorization managing server 20 are also connected to the apparatus for granting electronic signature 1. The authorization managing server 20 may be managed by the authority management organization.

The apparatus for granting electronic signature 1 acquires a certificate 17 from the IC card 13. The certificate 17 includes a public key 17a and the identification data 17b and is used to identify the owner of the secret key. Then the apparatus for granting electronic signature 1 acquires an authorization data from the authorization managing server 20 based on the certificate 17 to determine whether to grant the electronic signature.

When the apparatus for granting electronic signature 1 determines to grant the electronic signature, the apparatus for granting electronic signature 1 displays a message that indicates that the electronic signature is granted on the display unit 4, and grants the electronic signature to electronic data that the image reading unit 2 reads.

The apparatus for granting electronic signature 1 includes an input unit 5, an output unit 6, a controller 7, a memory unit 10, a communication unit 11, and an interface unit 12. The input unit 5 acquires the electronic data that the image reading unit 2 reads and is a target for granting the electronic signature.

The controller 7 includes a signature-granting determining unit 8 and an image-data processing unit 9. The signature-granting determining unit 8 determines whether to grant the electronic signature to the electronic data based on the certificate 17 that is input from the IC card 13 via the interface unit 12.

An identification-data certifying unit 8a outputs the identification data to the authorization managing server 20 via the communication unit 11, acquires the authorization data corresponding to the identification data from the authorization managing server 20, and then determines whether the secret-key owner has the authority to grant the electronic signature.

The authorization data has the data about the authority that the authority management organization grants to the secret-key owners. Examples of the data about the authority are: the data about whether the secret-key owner has the authority to grant the electronic signature; the levels of the authority; and the like. The authorization data is managed by the authority management organization.

The image-data processing unit 9 includes a hash value calculator 9a and a signature granting unit 9b. The hash value calculator 9a calculates a hash value from the electronic data that is input from the input unit 5 by using a hash function, and outputs the hash value to the IC card 13 via the interface unit 12. The interface unit 12 is an external interface to transfer the data with the IC card 13.

The signature granting unit 9b grants the electronic signature to the electronic data that is input from the IC card 13, and stores the electronic data with the electronic signature (hereinafter, "the data 10a with the signature") in the memory unit 10.

The IC card 13 includes an interface unit 14, a controller 15, and a memory unit 16. The interface unit 14 is an external interface to transfer the data with the IC card 13.

The controller 15 includes a signature creating unit 15a. The signature creating unit 15a creates the electronic signature using the hash value and the secret key 18, and outputs the electronic signature to the apparatus for granting electronic signature 1. The hash value is input from the apparatus for granting electronic signature 1 and the secret key 18 is stored in the memory unit 16.

The memory unit 16 stores the certificate 17 and the secret key 18. The certificate 17 includes the public key 17a corresponding to the secret key 18, and the identification data 17b to identify the owner of the secret key. The secret key 18 is used in creating the electronic signature.

Figure 2:
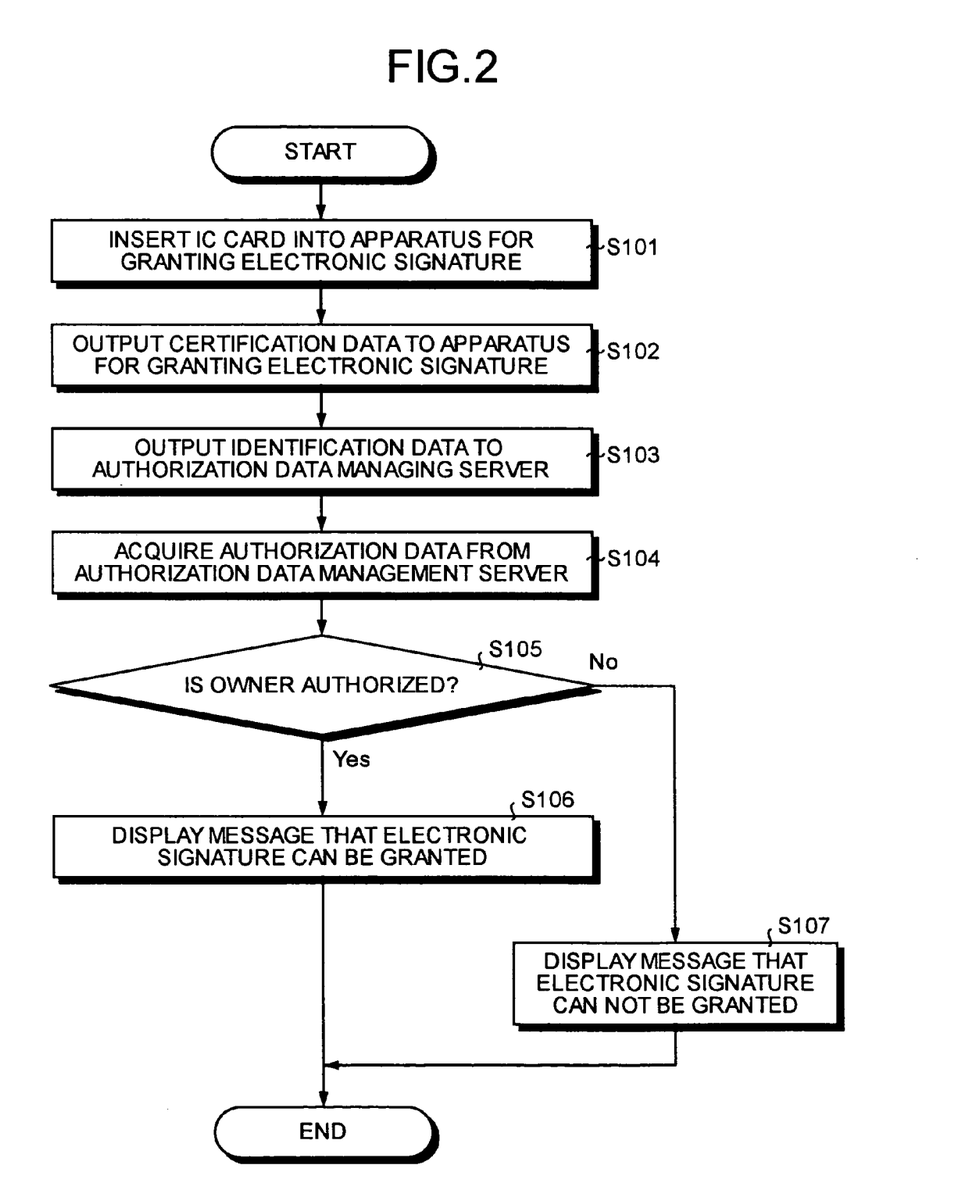
FIG. 2 is a flowchart of a procedure for determining whether to grant an electronic signature, according to the first embodiment.

FIG. 2 is a flowchart of a procedure for determining whether to grant an electronic signature, according to the first embodiment. The IC card 13 is attached to the apparatus for granting electronic signature 1 in step 101, and outputs the certificate 17 to the apparatus for granting electronic signature 1 in step 102. The identification-data certifying unit 8a outputs the identification data 17b of the certificate 17 to the authorization managing server 20 in step 103, acquires the authorization data from the authorization managing unit 20 in step 104, and determines whether the owner of the secret key 18 has the authority to grant the electronic signature in step 105.

If the owner of the secret key 18 is not authorized, the massage that indicates that the electronic signature can not be granted is displayed on the display unit 4 in step 107. Then the operations end. If the owner of the secret key 18 is authorized, the massage that indicates that the electronic signature can be granted is displayed on the display unit 4 in step 106. Then the operations end.

In this manner, when the IC card 13 is attached to the apparatus for granting electronic signature 1, the apparatus for granting electronic signature 1 acquires the certificate 17 from the IC card 13, outputs the identification data 17*d* of the certificate 17 to the authorization managing server 20, and then acquires the authorization data from the authorization managing server 20. Consequently, the apparatus for granting electronic signature 1 determines whether to grant the electronic signature to the electronic data.

Figure 3:
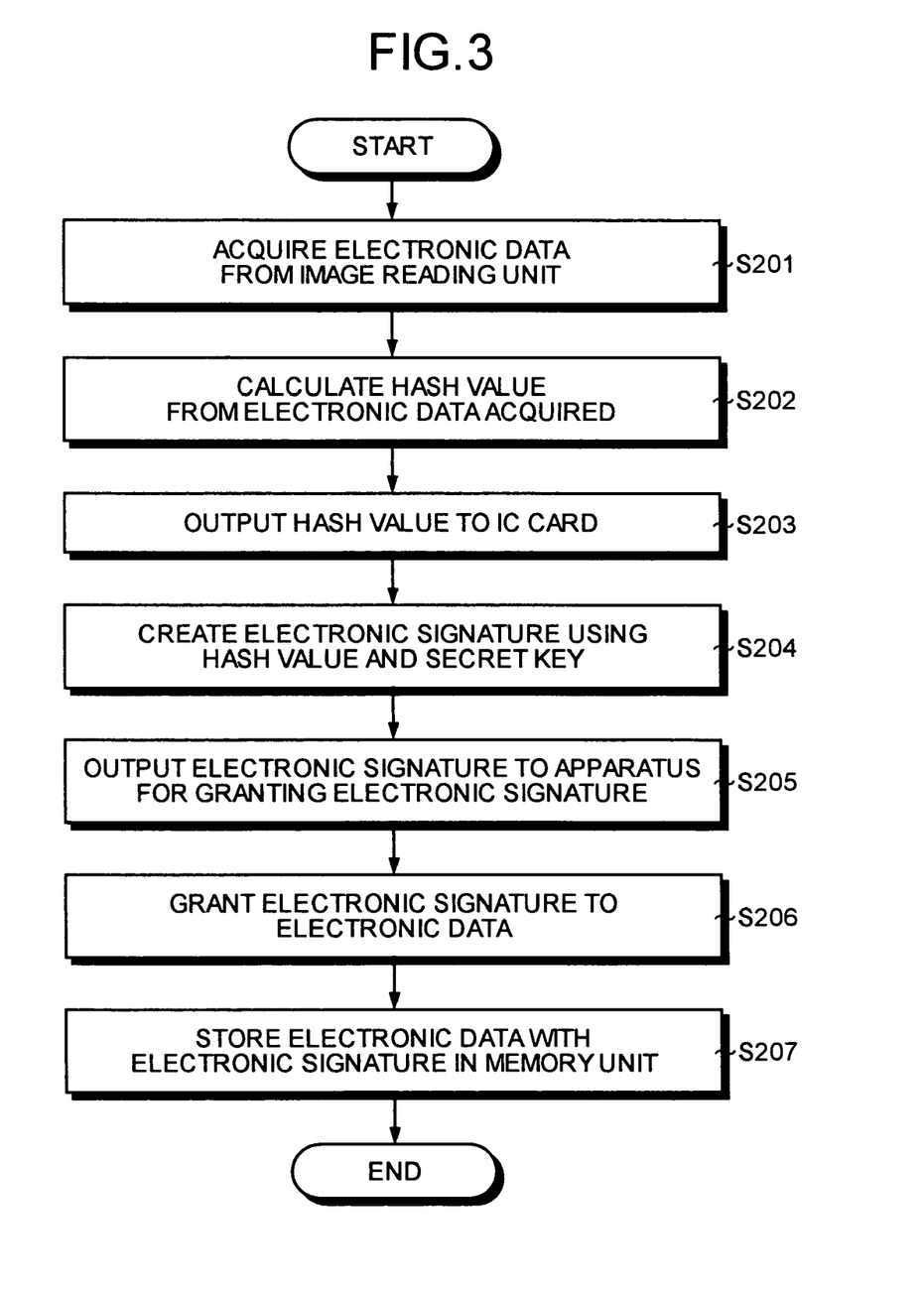
FIG. 3 is a flowchart of a procedure for granting electronic signature to electronic data, according to the first embodiment.

FIG. 3 is a flowchart of a procedure for granting electronic signature to electronic data, according to the first embodiment. The apparatus for granting electronic signature 1 acquires the electronic data from the image reading unit 2 in step 201.

The hash value calculator 9*a* calculates the hash value using the hash function in step 202, and outputs the hash value to the IC card 13 in step 203. The signature creating unit 15*a* creates the electronic signature using the hash value and the secret key 18 in step 204, and outputs the electronic signature to the apparatus for granting electronic signature 1 in step 205.

Subsequently, the signature granting unit 9*b* grants the electronic signature to the electronic data in step 209, and stores the electronic data with the electronic signature (hereinafter, "the data 10*a* with the signature") in the memory unit 10 in step 207. Then, the operations end.

In this manner, the apparatus for granting electronic signature 1 outputs the identification data 17*b* to the authorization managing server 20, and acquires the authorization data corresponding to the identification data 17*b*. Then the apparatus for granting electronic signature 1 determines whether to grant the electronic signature, that is, determines whether the owner of the secret key 18 has the authority to the grant the electronic signature. Consequently, the electronic signature that is granted to the electronic data gets more reliable.

In a second embodiment of the present invention, the apparatus for granting electronic signature manages the authorization data for the owner of the secret key, specifies what types of processing the secret-key owner is authorized to perform, and determines whether to grant the electronic data based on whether the processing specified is performed.

The paper documents are digitalized by the scanner, the OCR and the like. Preferably, without processing the electronic data, namely the paper documents digitalized, the electronic signature is granted to the electronic data and the electronic data with the electronic signature is stored in the memory unit. However, when the paper documents are digitalized, the characters digitalized are sometimes hard to read precisely.

The electronic data is processed to correct some characters that are unreadable precisely, but not to correct all the characters that are unreadable precisely. In the paper documents, there are important parts and unimportant parts. Not to process the unimportant parts like the important parts, the authority management organization issues a secret key to a certain user, and ranks the authority of granting the electronic signature when the authority is granted to the user.

When the user has the authority in the higher rank, the user is authorized to process the more-important parts. When the user has the authority in the lower rank, the user is not authorized to process the more-important parts. In the second embodiment, the "rank" of the authority is called the "authorized level".

Figure 4:
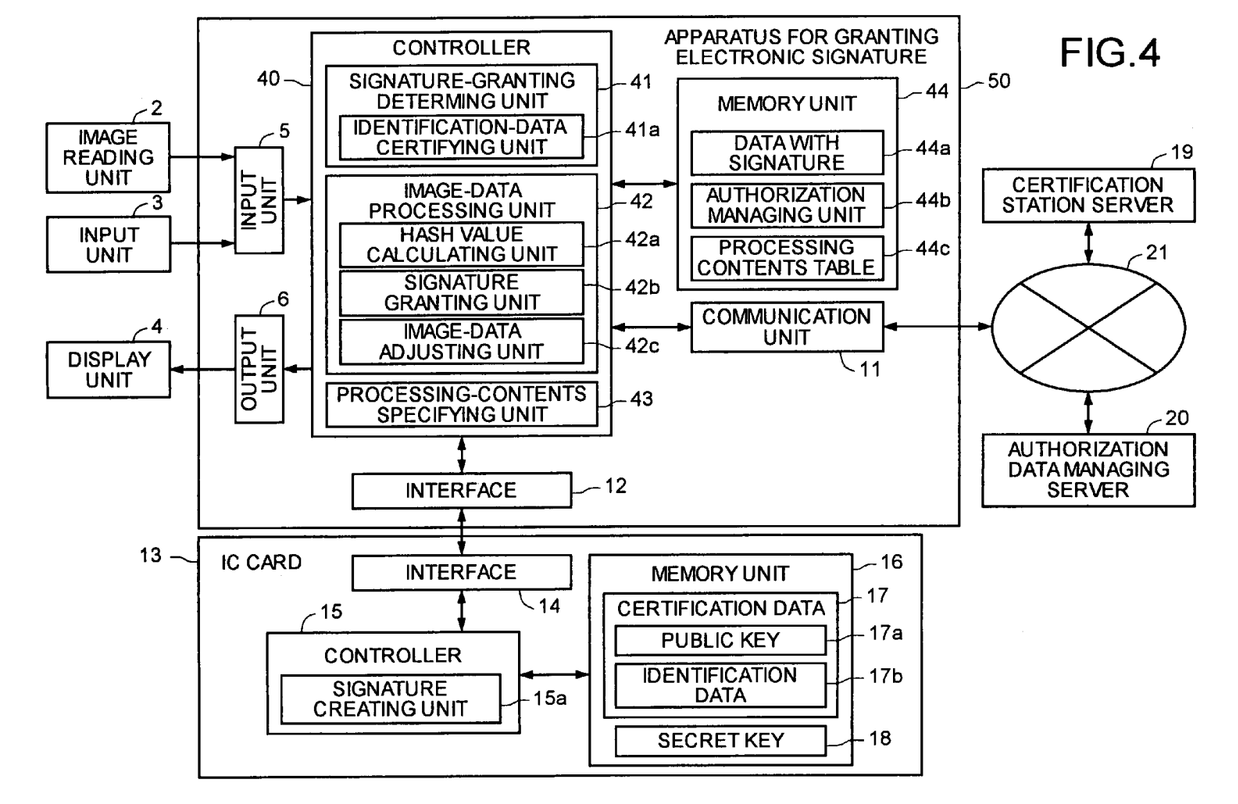
FIG. 4 is a schematic diagram of an apparatus for granting electronic signature, according to a second embodiment of the present invention.

FIG. 4 is a schematic diagram of an apparatus for granting electronic signature 50, according to the second embodiment. The apparatus for granting electronic signature 50 includes a controller 40 and a memory unit 44. The other components and the functions of the other components are same as those of the apparatus for granting electronic signature 1. Therefore, regarding the same components, the same reference symbols are applied, and regarding the same functions, the explanations are omitted.

The controller 40 includes a signature-granting determining unit 41, an image-data processing unit 42, and a processing-contents specifying unit 43. The signature-granting determining unit 41 includes an identification-data certifying unit 41*a*.

The identification-data certifying unit 41*a* acquired the authorization data from any one of an authorization managing unit 44*b* or the authorization managing server 20. In the former case, the identification-data certifying unit 41*a* acquires the authorization data corresponding to the identification data 17*b* from the authorization managing unit 44*b* of the memory unit 44, and determines whether to grant the electronic signature referring to the authorization data. In the latter case, the authorization managing unit 44*b* does not have the authorization data corresponding to the identification data 17*b*, so that the identification-data certifying unit 41*a* acquires the authorization data from the authorization managing server 20.

The authorization managing sever 20 includes the same configuration as the authorization managing unit 44*b*, and the authorization data that is acquired from the authorization managing server 20 or the authorization managing unit 44*d* includes the data about the authorized level.

The image-data processing unit 42 includes a hash value calculator 42*a*, a signature granting unit 42*b*, and an image-data adjusting unit 43*c*. The hash value calculator 42*a* calculates a hash value from the electronic data that is input from the input unit 5 by using a hash function, and outputs the hash value to the IC card 13 via the interface unit 12.

The signature granting unit 42*b* grants the electronic signature to the electronic data that is input from the IC card 13, and stores the electronic data with the electronic signature (hereinafter, "the data 44*a* with the signature") in the memory unit 44.

The image-data adjusting unit 42*c* processes the electronic data that is input from the input unit 5 based on the commands that are input from the input unit 3. A processing-contents specifying unit 43 specifies what types of processing can be performed to the electronic data referring to the authorization data and a processing contents table 44*c* of the memory unit 44.

Figure 5:
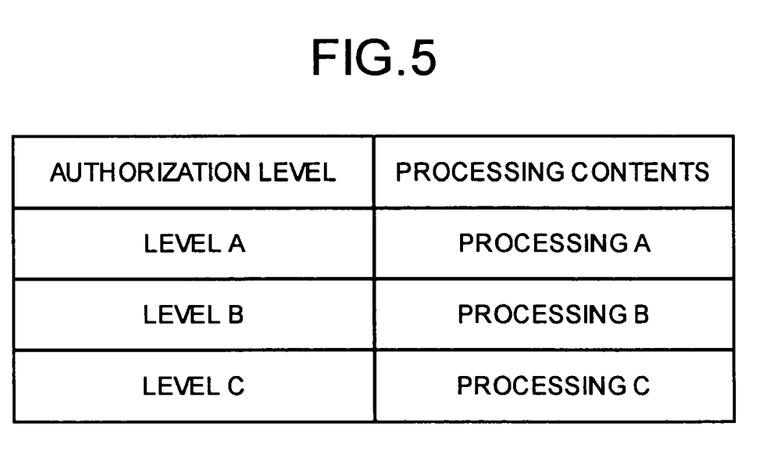
FIG. 5 is a table for specifying contents of image processing.

Referring now to FIG. 5, a processing contents table 44*c* indicates the authorized levels of the secret-key owner and the processing contents corresponding to the authorized levels. The authorization data includes the data about the authorized level. The processing contents show what types of processing the secret-key owner is authorized to perform to the data. When the level A is authorized to the secret-key owner, the secret-key owner is authorized to process the processing A, and the same applied to: the level B, the processing B; the level C, the processing C.

The level A is rankled higher than the level B, and the level B is ranked higher than the level C. Consequently, in the processing A, the more-important parts are processed than in the processing B. In the processing B, the more-important parts are processed than in the processing C.

Figure 6:
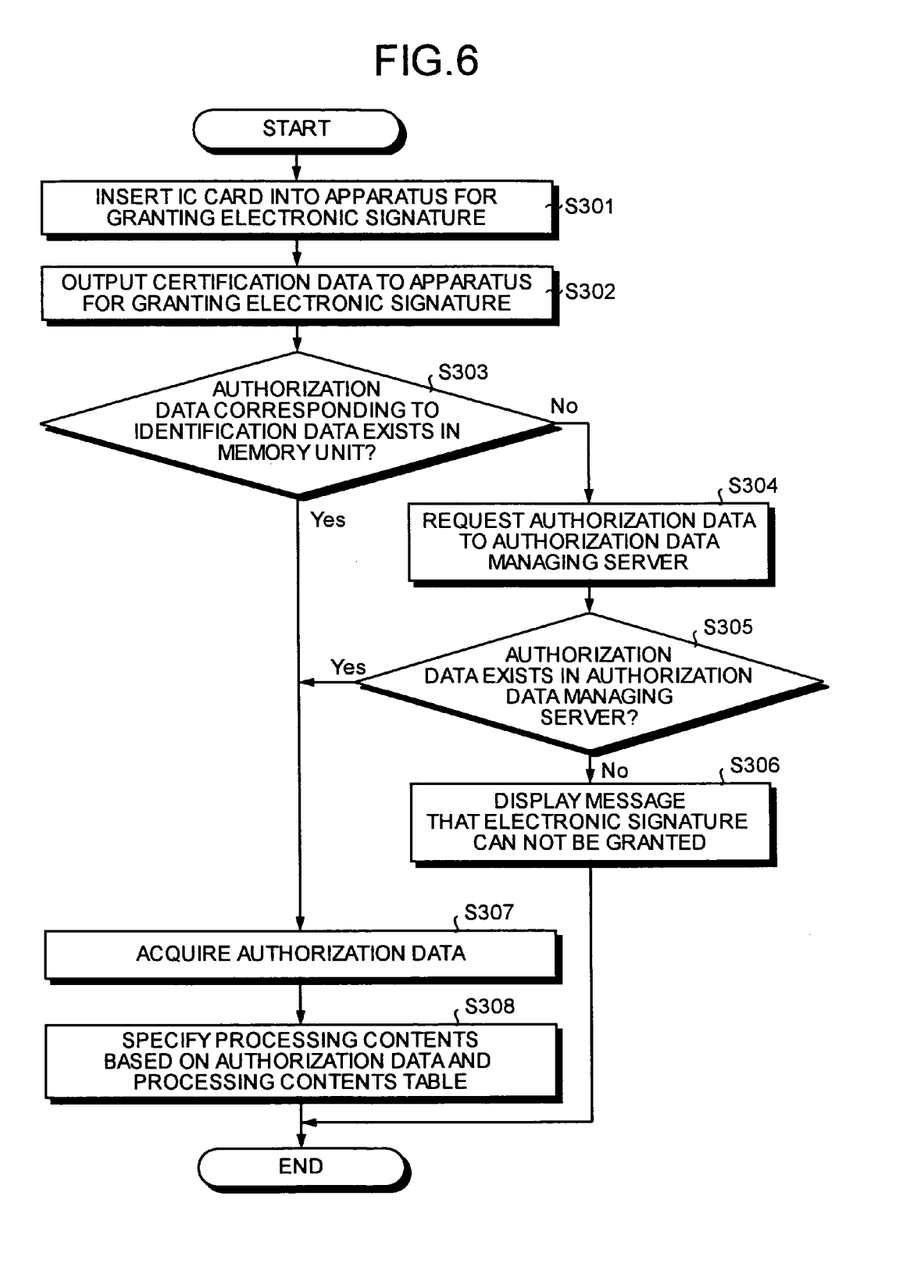
FIG. 6 is a flowchart of a procedure for determining whether to grant an electronic signature, according to the second embodiment.

FIG. 6 is a flowchart of a procedure for determining whether to grant an electronic signature, according to the second embodiment. The IC card 13 is attached to the apparatus for granting electronic signature 50 in step 301, and outputs the certificate 17 to the apparatus for granting electronic signature 50 in step 302.

The identification-data certifying unit 41a confirms whether the authorization managing unit 44b has the authorization data corresponding to the identification data 17b of the certificate 17 in step 303. If the authorization managing unit 44b does not have the authorization data, the identification-data certifying unit 41a requests the authorization data to the authorization managing server 20 in step 4, and confirms whether the authorization managing sever 20 has the authorization data in step 305.

If the authorization managing server 20 does not have the authorization data, a message that indicates that the electronic signature can not be granted is displayed on the display unit 4, and the operations end.

On the other hand, if the authorization managing sever 20 has the authorization data, or if the authorization managing unit 44b has the authorization data, the identification-data certifying unit 41 acquires the authorization data in step 307.

Subsequently, the processing-contents specifying unit 43 specifies what types of processing the secret-key owner is authorized to perform to the electronic data referring to the secret-key owner's authorized level that is included in the authorization data and the processing contents table 44c. Then the operations end.

In this manner, when the IC card 13 is attached to the apparatus for granting electronic signature 50, the apparatus for granting electronic signature 50 acquires the certificate 17 from the IC card 13, and then acquires the authorization data corresponding to the identification data 17b from the authorization managing unit 44b or the authorization managing server 20 based on the certificate 17.

Subsequently, the apparatus for granting electronic signature 50 determines whether to grant the electronic signature to the electronic data based on the authorization data, and specifies what types of processing can be performed to the electronic data based on the secret-key owner's authorized level that is included in the authorization data.

Figure 7:
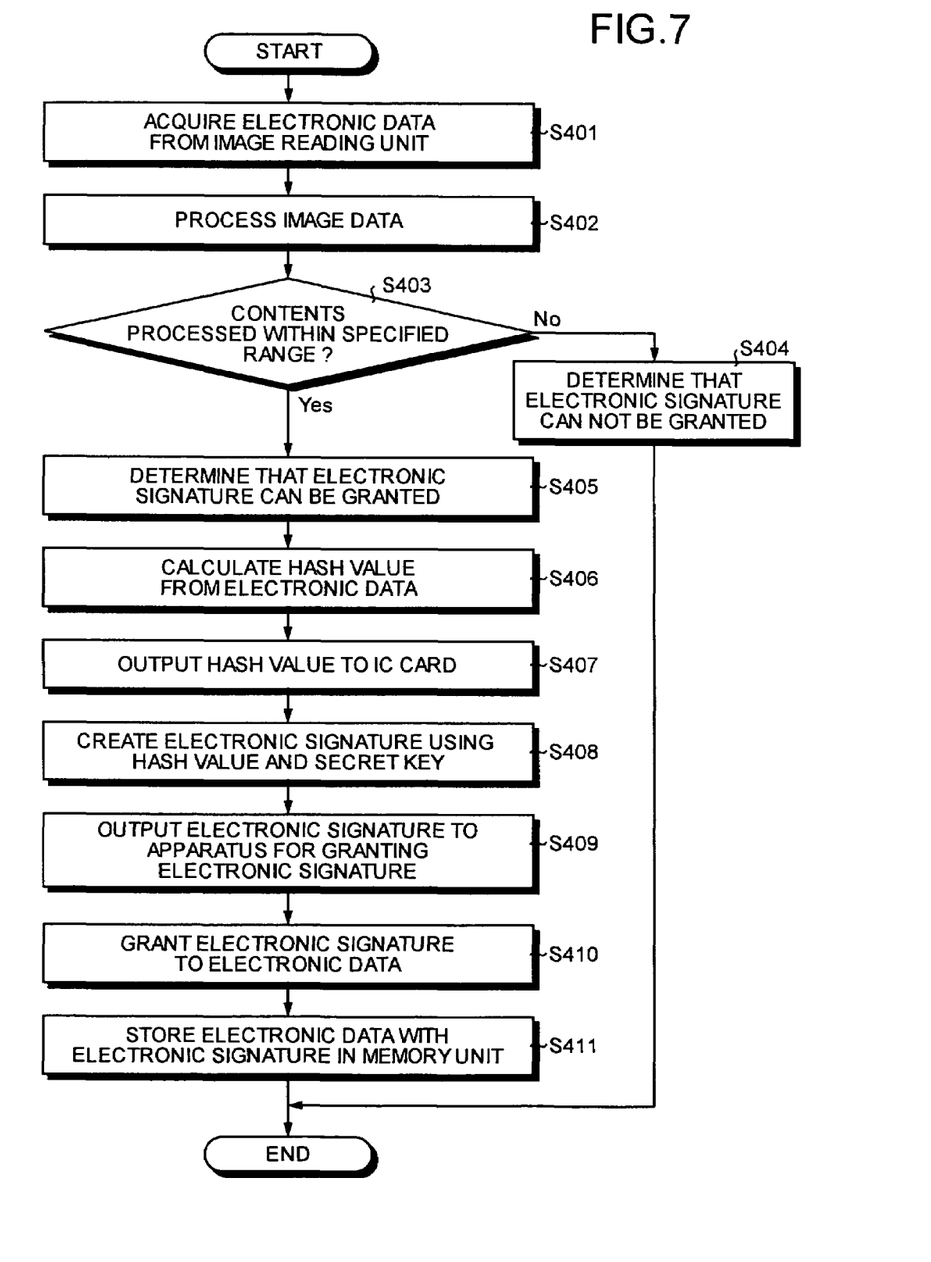
FIG. 7 is a flowchart of a procedure for granting electronic signature to electronic data, according to the second embodiment.

FIG. 7 is a flowchart of a procedure for granting electronic signature to electronic data, according to the second embodiment. The apparatus for granting electronic signature 50 acquires the electronic data from the image reading unit 2 in step 401, and processes the electronic data in step 402.

Then the processing-contents specifying unit 43 determines whether the contents processed are based on the processing specified in step 403. If the contents processed are not based on the processing specified, the apparatus for granting electronic signature 50 determines that the electronic signature can not be granted to the electronic data in step 404, and the operations end.

If the contents processed are based on the processing specified, the apparatus for granting electronic signature 50 determines that the electronic signature can be granted to the electronic data in step 405.

Then the hash value calculator 42a calculates a hash value using a hash function in step 406, and outputs the hash value to the IC card 13 in step 407. Subsequently, the signature creating unit 15a creates the electronic signature using the hash value and the secret key 18 in step 408, and outputs the electronic signature to the apparatus for granting electronic signature 50 in step 409.

Then the signature granting unit 42b grants the electronic signature that is input from the IC card 13 to the electronic data in step 410, and stores the electronic data with the electronic signature 8 hereinafter, "the data 44a with the signature") in the memory unit 44 in step 411, and finally the operations end.

In this manner, when the IC card 13 is attached to the apparatus for granting electronic signature 50, the apparatus for granting electronic signature 50 acquires the certificate 17 from the IC card 13, and then acquires the authorization data from the authorization managing unit 44b or the authorization managing server 20.

Subsequently, the apparatus for granting electronic signature 50 determines whether to grant the electronic signature to the electronic data based on the authorization data, and specifies what types of processing the secret-key owner is authorized to perform to the electronic data based on the authorization data, and then determines whether to grant the electronic data referring to whether the data processed is based on the processing specified.

Consequently, the electronic signature gets more reliable, because the apparatus for granting electronic signature 50 determines whether the secret-key owner has the authority to grant the electronic signature based on the authorization data corresponding to the identification data 17b.

Moreover, the dishonesty like a falsification of data is prevented. In the second embodiment, the electronic signature can not be grant to the data falsified, because the processing-contents specifying unit 43 specifies what types of processing can be performed to the electronic data based on the authorization data for the owner of the secret key 18 and a processing contents table 44c.

Although the data about the authorized level is in the authorization data in the second embodiment, the present invention is not to be thus limited. For example, the data about the authorized level may be included in other data such as the identification data 17b that is stored in the IC card 13.

Although the authorization managing server 20 manages the authorization data corresponding to the identification data 17b in the first embodiment and the second embodiment, the present invention is not to be thus limited. For example, the authorization managing server 20 may manage only the certification server 19 while the certification server 19 manages the data about the public key 17a and the authorization data to determine whether to grant the electronic signature.

The apparatus for granting electronic signature, the electronic signature granting method, and the electronic signature granting computer program according to the present invention have a beneficial effect on an apparatus that requires the higher reliability to digitalize the paper documents.

According to the present invention, the electronic signature that is granted gets more reliable because the electronic signature is granted based on the secret-key owner's authority. The electronic document also gets more reliable because the electronic signature is granted only when the processing that is specified based on the secret-key owner's authority is performed to the data. Moreover, without connecting to the network, the apparatus for granting electronic signature determines whether the owner of the secret key has the authority to grant the electronic signature and specifies what types of processing can be performed to the data because the apparatus for granting electronic signature has the authorization data inside.

In the technology of the present invention, the user who passes a certain qualifying test is authorized to process the data that is input to the apparatus for granting electronic signature, and to grant the electronic signature that is used to detect the falsification of the data. The qualifying test is conducted by the authority management organization that manages the authorization data. Consequently, the data processed gets more valid, more reliable, and more integral socially and commercially, that is, the authorized users are recognized to be higher reliable socially and commercially because the authorized users manage and exchange the data with the higher-integrity and the higher-reliability. On the other hand, the users who do not pass the qualifying test, namely the users who do not have the authorization data that is granted from the authority management organization get the less-reliable and less-integral data compared to the authorized users. Consequently, the unauthorized users have more difficulty in exchanging the data with the social-and-commercial reliability.

The unauthorized users hope to acquire the authorization data from the authority management organization so that the unauthorized users manage and exchange the data with the higher-reliability and the higher-integrity socially and commercially. To acquire the authorization data, unauthorized users come to have the trainings that the authority management organization conducts, such as a training of creating the electronic signature. Consequently, the qualifying test gets more worth and more popular socially; the quality of the trainings and the qualifying test gets better; and the management system of the authority management organization is enhanced. Moreover, certifying that the authorized users have the authority gets easier because the authority is granted to the authorized users in the easier way, that is, enclosing the authorized user's identification data and the secret key with the IC card, which is one of the peripheral units of the apparatus for granting electronic signature.

More users have the trainings, more users are authorized. The increase of the authorized users brings about more (social) demands of the apparatus for granting electronic signature and the peripheral unit. Consequently, the manufacturers of the apparatus for granting electronic signature and the peripheral unit get more worth and more popular socially, enhance the manufacturing system, and focus on improving the quality of these units and increasing the quantity of these units.

More users have the trainings, more certificates are issued. The certificate certifies that the user have the key for the electronic signature duly. Consequently, more users are managed by the certificate issue organization, and the certificate issue organization gets more worth and more popular, enhances the management system, and focuses on improving the reliability of the certificate. Accordingly, the electronic signature that is created using the certificate from the certificate issue organization gets more reliable and integral.

The present invention has advantages for the authorization management authority, the authorized users, the manufacturer of the apparatus for granting electronic signature, and the certificate issue organization, and the technology of the present invention has the effects socially and commercially. The advantages are: 1) the authorized user gets more reliable and integral socially and commercially because the data that the authorized user creates gets more reliable and integral socially and commercially; 2) the authority management organization that grants the authorization data gets more worth and more popular, because growing demand of the data exchange with the higher-reliability and the higher-integrity causes more users to have the trainings that are conducted by the authority management organization; and 3) the authorized user gets further more reliable and integral socially and commercially, because the authorized user uses the apparatus for granting electronic signature, the peripheral unit, and the certificate more often, so that the manufacturers and the certificate issue organization enhance the manufacturing system and the management system respectively.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for granting electronic signature to a data, comprising:
   a database that stores authorization data corresponding to identification data;
   an identification-data acquiring unit that acquires identification data for identifying an owner of a secret key that is used to create the electronic signature;
   an image-data processing unit that includes a hash value calculator that calculates a hash value from the data that is used with the secret key to create the electronic signature;
   an authorization-data acquiring unit that acquires the authorization data corresponding to the identification data from the database;
   a signature-granting determining unit that determines whether to grant the electronic signature to the data based on the authorization data acquired; and
   an integrated circuit (IC) device interface, wherein
   a removable integrated circuit (IC) device connected to the apparatus through the IC device interface acquires the hash value from the apparatus and creates the electronic signature using the hash value and the secret key and outputs the electronic signature to the apparatus.

2. The apparatus according to claim 1, further comprising a processing-specifying unit that specifies a processing to be performed to the data based on the authorization data; and
   a processing unit that performs specified processing on the data, wherein
   when the processing unit performs the specified processing on the data, the signature-granting determining unit determines to grant the electronic signature to the data.

3. The apparatus according to claim 2, wherein the processing includes correcting at least one character.

4. The apparatus according to claim 1, further comprising an authorization-data managing unit that manages the authorization data, wherein
   the authorization-data acquiring unit acquires the authorization data from the authorization-data managing unit.

5. The apparatus according to claim 1, further comprising a communication unit that communicates with external units including an authorization-data managing server that manages the authorization data, wherein
   the authorization-data acquiring unit acquires the authorization data from the authorization-data managing server via the communication unit.

6. A method of granting an electronic signature to a data, comprising:
   storing authorization data corresponding to identification data in a database;
   acquiring identification data for identifying an owner of a secret key that is used to create the electronic signature;
   processing image data, including calculating a hash value from the data that is used with the secret key to create the electronic signature;
   acquiring the authorization data corresponding to the identification data from the database;
   determining whether to grant the electronic signature to the data based on the authorization data acquired, wherein
   a removable integrated circuit (IC) device, connected to an external apparatus through an IC device interface, acquires the hash value from the external apparatus and creates the electronic signature using the hash value and the secret key and outputs the electronic signature to the external apparatus.

7. The method according to claim 6, further comprising specifying a processing to be performed to the data based on the authorization data acquired; and performing specified processing on the data; wherein when the data is processed based on the specified processing, the determining includes determining to grant the electronic signature to the data.

8. The method according to claim 7, wherein the processing includes correcting at least one character.

9. The method according to claim 6, further comprising managing the authorization data, wherein the acquiring authorization data includes acquiring of the authorization data from the managing.

10. The method according to claim 6, wherein the acquiring authorization data includes acquiring of the authorization data from an authorization-data managing server that is connected via a network.

11. A computer-readable medium encoded with a computer program for granting an electronic signature to data, the program, when executed by a computer, causing the computer to perform a method comprising:

storing authorization data corresponding to identification data in a database;

acquiring identification data for identifying an owner of a secret key that is used to create the electronic signature;

processing image data, including calculating a hash value from the data that is used with the secret key to create the electronic signature;

acquiring the authorization data corresponding to the identification data from the database; and determining whether to grant the electronic signature to the data based on the authorization data acquired, wherein a removable integrated circuit (IC) device, connected to an external apparatus through an IC device interface, acquires the hash value from the external apparatus and creates the electronic signature using the hash value and the secret key and outputs the electronic signature to the external apparatus.

12. The method according to claim 11, further comprising specifying a processing to be performed to the data based on the authorization data acquired and processing the data, wherein when the data is processed based on the processing specified, the determining includes determining of granting the electronic signature to the data.

13. The method according to claim 12, wherein the processing includes correcting at least one character.

14. The method according to claim 11, further comprising managing the authorization data, wherein the acquiring authorization data includes acquiring of the authorization data from the managing.

15. The method according to claim 11, wherein the acquiring authorization data includes acquiring of the authorization data from an authorization-data managing server that is connected via a network.

16. The method according to claim 11, wherein the acquiring identification data includes acquiring of the identification data stored in a unit having the secret key.

17. A system for granting an electronic signature to data, comprising:

an apparatus for granting the electronic signature to the data, comprising:

a database that stores authorization data corresponding to identification data;

an identification-data acquiring unit that acquires the identification data for identifying an owner of a secret key that is used to create the electronic signature;

an image-data processing unit that includes a hash value calculator that calculates a hash value from the data that is used with the secret key to create the electronic signature;

an authorization-data acquiring unit that acquires the authorization data corresponding to the identification data from the database;

a signature-granting determining unit that determines whether to grant the electronic signature to the database on the authorization data acquired; and an integrated circuit (IC) device interface; and a removable integrated circuit (IC) device, comprising:

a storing unit that stores the identification data for identifying the owner of the secret key, wherein the removable IC device is connected to the apparatus through the IC device interface and acquires the hash value from the apparatus and creates the electronic signature using the hash value and the secret key and outputs the electronic signature to the apparatus.

18. A method of granting an electronic signature to a data, comprising:

acquiring identification data for identifying an owner of a secret key that is used to create the electronic signature;

calculating a hash value and outputting the hash value to a removable integrated circuit (IC) device;

acquiring authorization data corresponding to the identification data from a database;

determining whether to grant the electronic signature to the data based on the authorization data acquired;

specifying a processing to be performed to the data based on the authorization data acquired; and performing specified processing on the data, wherein the removable integrated circuit (IC) device acquires the hash value and creates the electronic signature using the hash value and the secret key, when the data is processed based on the specified processing, the determining includes determining to grant the electronic signature to the data, and the processing includes correcting at least one character.

19. A computer-readable medium encoded with a computer program for granting an electronic signature to data, the program, when executed by a computer, causing the computer to perform a method comprising:

acquiring identification data for identifying an owner of a secret key that is used to create the electronic signature;

calculating a hash value and outputting the hash value to a removable integrated circuit (IC) device;

acquiring authorization data corresponding to the identification data from a database;

determining whether to grant the electronic signature to the data based on the authorization data acquired; and specifying a processing to be performed to the data based on the authorization data acquired and processing the data, wherein the removable integrated circuit (IC) device acquires the hash value and creates the electronic signature using the hash value and the secret key, when the data is processed based on the processing specified, the determining includes determining of granting the electronic signature to the data, and the processing includes correcting at least one character.

* * * * *